US011223848B2

(12) United States Patent
Xiu et al.

(10) Patent No.: US 11,223,848 B2
(45) Date of Patent: Jan. 11, 2022

(54) WEIGHTED TO SPHERICALLY UNIFORM PSNR FOR 360-DEGREE VIDEO QUALITY EVALUATION USING CUBEMAP-BASED PROJECTIONS

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/621,965

(22) PCT Filed: Jun. 29, 2018

(86) PCT No.: PCT/US2018/040343
§ 371 (c)(1),
(2) Date: Dec. 12, 2019

(87) PCT Pub. No.: WO2019/006336
PCT Pub. Date: Mar. 1, 2019

(65) Prior Publication Data
US 2020/0169753 A1 May 28, 2020

Related U.S. Application Data

(60) Provisional application No. 62/527,559, filed on Jun. 30, 2017.

(51) Int. Cl.
*H04N 19/597* (2014.01)
*H04N 19/126* (2014.01)
(Continued)

(52) U.S. Cl.
CPC ......... *H04N 19/597* (2014.11); *H04N 19/126* (2014.11); *H04N 19/154* (2014.11); *H04N 19/61* (2014.11)

(58) Field of Classification Search
CPC .. H04N 19/597; H04N 19/126; H04N 19/154; H04N 19/61
See application file for complete search history.

(56) References Cited

U.S. PATENT DOCUMENTS

2017/0336705 A1* 11/2017 Zhou ..................... G06T 3/0062
2017/0374385 A1* 12/2017 Huang ................. H04N 19/105
(Continued)

OTHER PUBLICATIONS

Abbas, Adeel, "GoPro Test Sequences for Virtual Reality Video Coding", JVET-C0021, GoPro, Joint Video Exploration Team (JVET) of ITU-T SG 16 WP 3 and ISO/IEC JTC 1/SC 29/WG 11, 3rd Meeting: Geneva, CH, May 26-31, 2016, 10 pages.
(Continued)

*Primary Examiner* — Rowina J Cattungal
(74) *Attorney, Agent, or Firm* — Condo Roccia Koptiw LLP

(57) ABSTRACT

360-degree video content may be coded. A sampling position in a projection format may be determined to code 360-degree video content. For example, a sampling position in a target projection format and a sampling position in a reference projection format may be identified. The sample position in the target projection format may be related to the corresponding sample position in the reference projection format via a transform function. A parameter weight (e.g., a reference parameter weight) for the sampling position in the reference projection format may be identified. An adjustment factor associated with the parameter weight for the sampling position in the reference projection format may be determined. The parameter weight (e.g., adjusted parameter weight) for the sampling position in the target projection
(Continued)

format may be calculated. The calculated adjusted parameter weight may be applied to the sampling position in the target projection format when coding the 360-degree video content.

20 Claims, 15 Drawing Sheets

(51) Int. Cl.
 *H04N 19/154* (2014.01)
 *H04N 19/61* (2014.01)

(56) References Cited

U.S. PATENT DOCUMENTS

| | | | | |
|---|---|---|---|---|
| 2018/0160123 | A1* | 6/2018 | Van Der Auwera | ............................ H04N 19/513 |
| 2018/0278936 | A1* | 9/2018 | Hendry | ................ H04N 19/103 |
| 2019/0373240 | A1* | 12/2019 | Alshina | .................. H04N 19/96 |
| 2020/0084428 | A1* | 3/2020 | Oh | ........................ H04N 21/816 |

OTHER PUBLICATIONS

Bang et al., "Description of 360 3D Video Application Exploration Experiments on Divergent Multi-View Video", Requirements, ISO/IEC JTC1/SC29/WG11 MPEG2015/ M16129, San Diego, US, Feb. 2016, 5 pages.

Boyce et al., "JVET Common Test Conditions and Evaluation Procedures for 360° Video", JVET-F1030, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.

Carbotte, Kevin, "Google Looks To Solve VR Video Quality Issues With Equi-Angular Cubemaps (EAC)", Tom's Hardware, Document Available at: URL:https://www.tomshardware.com/news/google-equi-angulra-cubemap-projection-technology, 33917.html, Mar. 15, 2017, pp. 1-8.

Chen et al., "Algorithm Description of Joint Exploration Test Model 7 (JEM 7)", JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Choi, Byeongdoo, "Technologies Under Consideration for Omnidirectional Media Application Format", Systems Subgroup, ISO/IEC JTC1/SC29/WG11 N15946, San Diego, CA, US, Feb. 2016, 16 pages.

Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.

Facebook360, "Facebook 360 Video", Document Available at URL:https://facebook360.fb.com/, Apr. 4, 2019, pp. 1-5.

Github, "Facebook's Equirectangular to Cube Map Tool on GitHub", Transform 360, Document Available at URL:https://github.com/facebook/transform?files=1, Nov. 9, 2018, pp. 1-3.

Google VR, "Google Cardboard", Document Available at URL:https://www.google.com/get/cardboard/, Nov. 9, 2018, pp. 1-4.

Hendry et al., "AHG8: Adaptive QP for 360° Video ERP Projection", JVET-F0049, Qualcomm Incorporated, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-4.

Ho et al., "Unicube for Dynamic Environment Mapping", IEEE Transactions on Visualization and Computer Graphics, vol. 17, No. 1, Jan. 2011, pp. 51-63.

HTC, "HTC Vive", Document Available at URL:https://www.htcvive.com/us/, Apr. 4, 2019, pp. 1-3.

ISO/IEC, "Requirements for OMAF", Requirements, ISO/IEC JTC1/SC29/WG11 N16143, San Diego, CA, US, Feb. 2016, 2 pages.

Kuzyakov et al., "Next-Generation Video Encoding Techniques for 360 Video and VR", Facebook Code, Document Available at URL:https://code.facebook.com/posts/1126354007399553/next-generation-video-encoding-techniques-for-360-video-and-vr/, Jan. 21, 2016, pp. 1-6.

Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11,2nd Meeting: San Diego, USA, Feb. 20-26, 2016, pp. 1-4.

Oculus, "Oculus Rift", Document Available at URL:https://www.oculus.com/en-us/rift/, Apr. 4, 2019, pp. 1-19.

Sun et al., "AHG8: Stretching Radio Based Adaptive Quantization for 360 Video", JVET-F0072, Zhejiang University, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-4.

Sun et al., "WS-PSNR for 360 Video Quality Evaluation", Zhejiang University, ISO/IEC JTC1/SC29/WG11 MPEG2016/M38551, Geneva, CH, May 2016, 3 pages.

Thomas et al., "5G and Future Media Consumption", TNO, ISO/IEC JTC1/SC29/WG11 MPEG2016/m37604, San Diego, CA, US, Feb. 2016, 10 pages.

Wien et al., "Preliminary Joint Call for Evidence on Video Compression with Capability Beyond HEVC", JVET-E1002, JVET, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-9.

Xiu et al., "AHG8: On the Derivation of Weighted to Spherically Uniform PSNR (WS-PSNR) for Adjusted Cubemap Projection (ACP) Format", JVET-G0088, InterDigital Communications Inc., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.

Ye et al., "Algorithm Descriptions of Projection Format Conversion and Video Quality Metrics in 360Lib", JVET, ISO/IEC JTC1/SC29/WG11/N16888, Hobart, AU, Apr. 2017, pp. 1-32.

\* cited by examiner

WEIGHTED TO SPHERICALLY UNIFORM PSNR FOR 360-DEGREE VIDEO QUALITY EVALUATION USING CUBEMAP-BASED PROJECTIONS

CROSS-REFERENCE TO RELATED APPLICATION

This application is the National Stage Entry under 35 U.S.C. § 371 of Patent Cooperation Treaty Application No. PCT/US2018/040343, filed Jun. 29, 2018, which claims the benefit of U.S. Provisional Application Ser. No. 62/527,559 filed Jun. 30, 2017, the contents of which are incorporated by reference herein.

BACKGROUND

Virtual reality (VR) is increasingly entering our daily lives. VR has many application areas, including healthcare, education, social networking, industry design/training, game, movie, shopping, entertainment, etc. VR is gaining attention from industries and consumers because VR is capable of bringing an immersive viewing experience. VR creates a virtual environment surrounding the viewer and generates a true sense of "being there" for the viewer. How to provide the full real feeling in the VR environment is important for a user's experience. For example, the VR system may support interactions through posture, gesture, eye gaze, voice, etc. To allow the user to interact with objects in the VR world in a natural way, the VR may provide haptic feedback to the user.

SUMMARY 360-degree video content may be coded as described herein. 360-degree video content described herein may include or may be a spherical video content, an omnidirectional video content, a virtual reality (VR) video content, a panorama video content, an immersive video content (e.g., a light field video content that includes 6 degree of freedom), a point cloud video content, and/or the like.

A sampling position in a projection format may be determined to code 360-degree video content. For example, a sampling position in a target projection format and a sampling position in a reference projection format may be identified. The target projection format may include at least one of an unicube map projection (UNICMP) format, an equi-angular cubemap (EAC) format, an adjusted cubemap projection (ACP) format, a hybrid cubemap projection (HCP) format, and/or the like. The reference projection format may include a cube map projection (CMP) format and/or the like.

The sample position in the target projection format may be related to the corresponding sample position in the reference projection format via a transform function. The transform function may be defined by one or more parameters received in a bitstream.

A parameter weight (e.g., a reference parameter weight) for the sampling position in the reference projection format may be identified. In examples, the parameter weight for the sampling position in the reference projection format may be identified based on a location of the sampling position in the reference projection format.

An adjustment factor associated with the parameter weight for the sampling position in the reference projection format may be determined. For example, the adjustment factor associated with the parameter weight for the sampling position in the reference projection format may be determined based on the transform function between the sampling position in the target projection format and the sampling position in the reference projection format. The adjustment factor may a derivative value of the transform function. In examples, the derivative value of the transform function may be or may include a horizontal coordinate and/or a vertical coordinate for the sampling position in the target projection format and/or the reference projection format.

A parameter weight (e.g., adjusted parameter weight) for the sampling position in the target projection format may be calculated. For example, an adjusted parameter weight for the sampling position in the target projection format may be calculated based on the parameter weight and the determined adjustment factor for the sampling position in the reference projection format. The calculated adjustment parameter weight may include or may be a weighted spherically uniform peak signal-to-noise ratio (WS-PSNR) weight.

The calculated adjusted parameter weight may be applied to the sampling position in the target projection format when the 360-degree video content is coded. In examples when applying the adjusted parameter weight to the sampling position in the target projection, a quantization parameter (QP) for a transform-coded portion of the 360-degree video content for the sampling position in the target projection format may be determined based on the adjusted parameter weight. In examples when applying the adjusted parameter weight to the sampling position in the target projection, a WS-PSNR weight for the sampling position in the target projection format may be determined by adjusting a WS-PSNR weight for the sampling position in the reference projection format using the calculated adjustment factor. In examples when applying the adjusted parameter weight to the sampling position in the target projection, at least one of a distortion or a quality measurement associated the sampling position in the target projection format may be determined using the adjusted parameter weight. In examples when applying the adjusted parameter weight to the sampling position in the target projection, a weighted sum of absolute difference (SAD) between the sampling position in the target projection format and the reference projection format may be determined.

BRIEF DESCRIPTION OF THE DRAWINGS

A more detailed understanding may be described from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

VR system(s) may use 360-degree video to provide a user(s) the capability to view a scene, e.g., from 360-degree angles in the horizontal direction and 180-degree angles in the vertical direction. VR and 360-degree video may be considered to be the direction for media consumption beyond Ultra High Definition (UHD) service. Work on the requirements and potential technologies for omnidirectional media application format may be performed to improve the quality of 360-degree video in VR and/or to standardize the processing chain for client's interoperability. Free view TV (FTV) may test the performance of one or more of the following: (1) 360-degree video (omnidirectional video) based system; and/or (2) multi-view based system.

The quality and/or experience of one or more aspects in the VR processing chain may be improved. For example, the quality and/or experience of one or more aspects in capturing, processing, display, etc., and/or VR processing may be improved. On the capturing side, VR may use one or more cameras to capture a scene from one or more (e.g., different) divergent views (e.g., 6-12 views). The views may be stitched together to form a 360-degree video in high resolution (e.g., 4K or 8K). On the client side and/or the user side, the virtual reality system may include a computation platform, head mounted display (HMD), and/or head tracking sensors. The computation platform may be in charge of receiving and/or decoding 360-degree video, and/or generating the viewport for display. Two pictures, one for each eye, may be rendered for the viewport. The two pictures may be displayed in a HMD (e.g., for stereo viewing). The lens may be used to magnify the image displayed in HMD for better viewing. The head tracking sensor may keep (e.g., constantly keep) track of the viewer's head orientation and/or may feed the orientation information to the system to display the viewport picture for that orientation.

VR systems may provide a touch device for a viewer to interact with objects in the virtual world. VR systems may be driven by a powerful workstation with good GPU support. A light VR system may use a smartphone as a computation platform, HMD display, and/or head tracking sensor. The spatial HMD resolution may be 2160×1200, refresh rate may be 90 Hz, and/or the field of view (FOV) may be 110 degrees. The sampling density for head tracking sensor may be 1000 Hz, which may capture fast movement. A VR system may include a lens and/or cardboard. A VR system may be driven by a smartphone.

Figure 1:
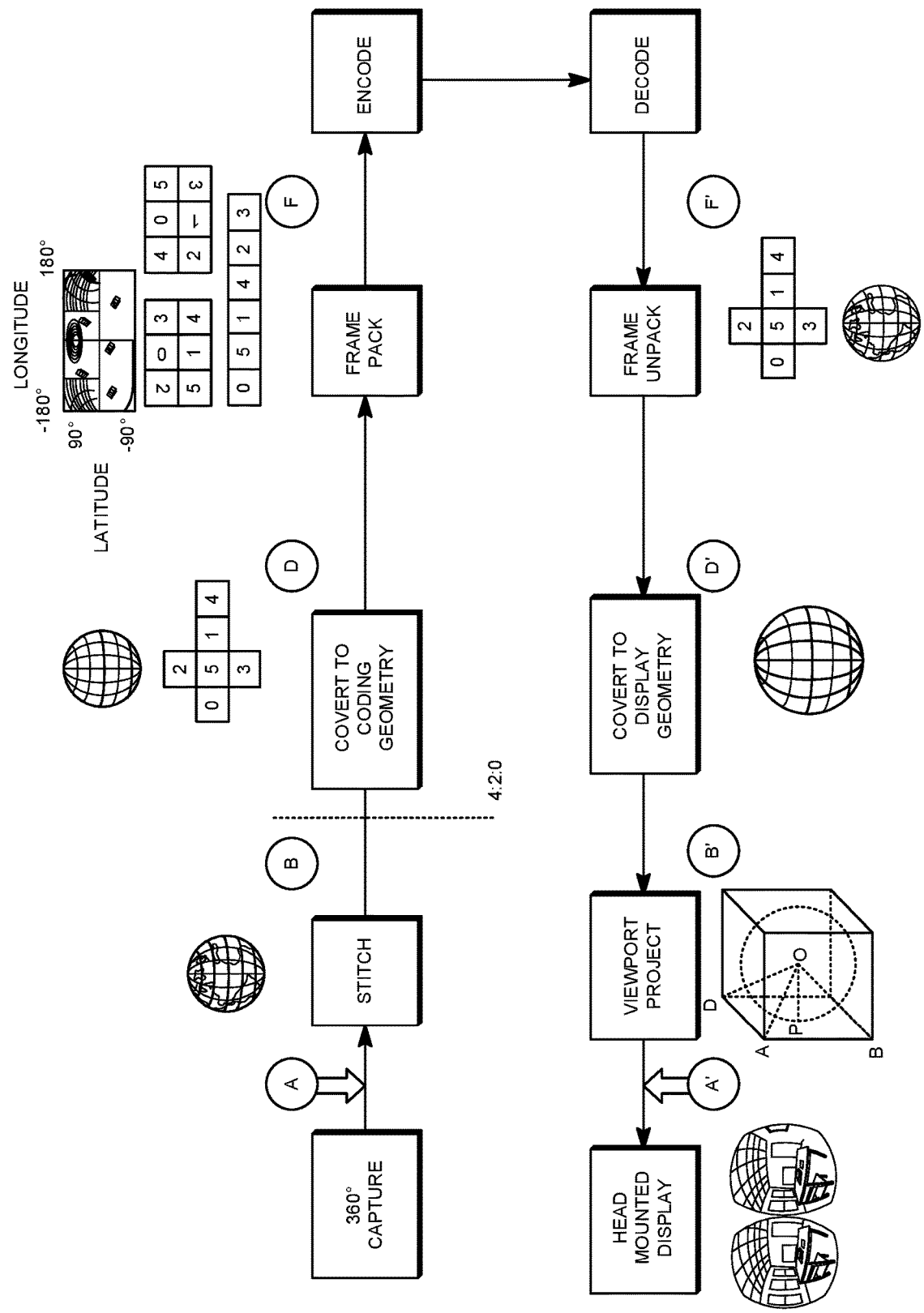
FIG. 1 shows an example of a 360-degree video system.

An example workflow for 360-degree video system may be illustrated in FIG. 1. The example workflow for 360-degree video system may include a 360-degree video capturing process which may use one or more cameras to capture videos covering the sphere (e.g., the entire sphere). The videos may be stitched together in a native geometry structure. For example, the videos may be stitched together in an equirectangular projection (ERP) format. The native geometry structure may be converted to one or more projection formats for encoding, e.g., based on the existing video codecs. At the receiver, the video may be decoded and/or the decompressed video may be converted to the geometry for display. The video may be used for rendering via viewport projection according to user's viewing angle.

Figure 2B:
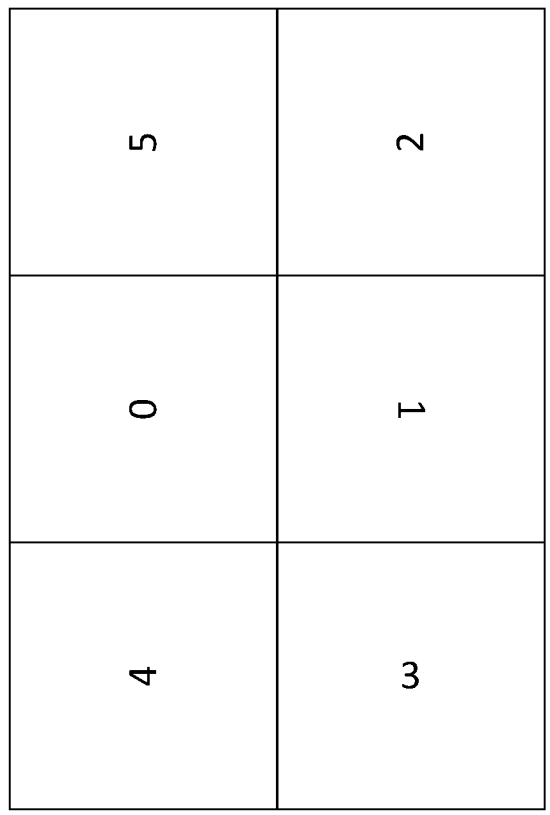
FIG. 2B shows a CMP example 2D planar for 6 faces.
Figure 2A:
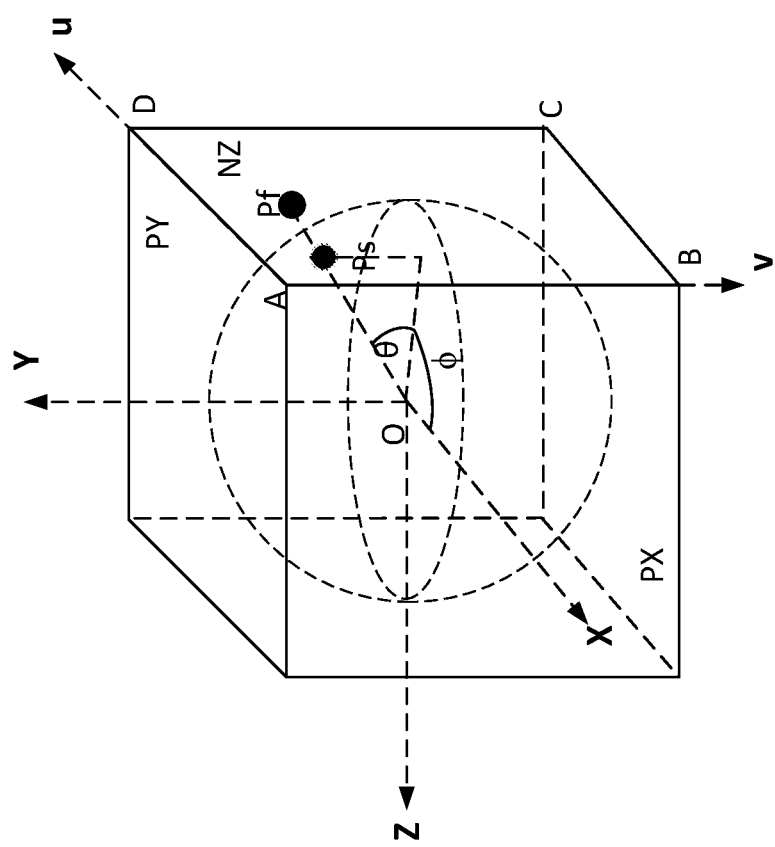
FIG. 2A shows a CMP example 3D geometry structure, PX (0), NX (1), PY (2), NY (3), PZ (4), and NZ (5).
Figure 2C:
FIG. 2C shows an example projective picture with CMP.

Cube map projection of 360-degree video may be performed. A 360-degree video compression and/or delivery system may be performed. 360-degree video delivery may represent the 360-degree information using a sphere geometry structure. For example, synchronized views captured by one or more cameras may be stitched on the sphere as an integral structure. The sphere information may be projected to a 2D planar surface with a given geometry conversion. A spherical mapping format used in the graphics communities may be a cube map projection (CMP) format. FIG. 2 shows an example projective geometry of the CMP format. As shown in FIG. 2A, the CMP may include one or more square faces (e.g., 6 square faces), labeled as PX, PY, PZ, NX, NY, and NZ, where P may stand for positive, N may stand for negative, and/or X, Y, Z may refer to the axes. The faces may be labeled using numbers. For example, the faces may be labeled as 0-5 according to PX (0), NX (1), PY (2), NY (3), PZ (4), NZ (5). If the radius of the tangent sphere is 1, the lateral length of each face may be 2. Video codec may not be designed to handle sphere video. If video codec is not designed to handle sphere video, the 6 faces of CMP format may be packed together into a picture (e.g., a single picture). To maximize the continuity between neighboring faces, one or more faces may be rotated by a predefined degree. FIG. 2B shows an example packing which may place the 6 faces into a rectangular picture. In FIG. 2B, a face index may be put in the direction that is aligned with the corresponding rotation of the face (e.g., for better visualization). For example, face #3 and/or face #1 may be rotated counter-clockwise by 270 and 180 degrees, respectively, while one or more (e.g., all) of the other faces may not rotated. An example picture with CMP may be shown in FIG. 2C. The resulting motion field (which may describe the temporal correlation between neighboring 2D projective pictures) generated by CMP may be represented (e.g., efficiently represented) by the translational motion model of video codecs, for example, due to its rectilinear structure.

Unicube map projection for 360-degree video coding may be performed.

The CMP format may be computationally efficient. Due to the limitation of the rectilinear projection, the samples on the sphere may be unevenly sampled by the CMP format with a higher sampling density near face boundaries and/or a lower sampling density near face centers. Non-uniform spherical sampling may penalize the efficiency of 360-degree video representation and/or may reduce the efficiency of 360-degree video coding, for example, because the existing coding algorithms may be built upon the assumption that one or more (e.g., all) of the samples on the planar picture may be important (e.g., equally important). The non-uniform sampling of the CMP may result in the quality of the regions around the face boundaries being higher than that of the regions around the face centers when 360-degree video is coded by existing video codecs. The samples on the sphere may not have the same importance with respect to a viewer's visual experience. For example, viewers may be more likely to view the content in the vicinity of the face centers than the face boundaries. Having different sampling densities may cause warping and/or deformation of an object as it moves from the center of the face to the face boundary (or vice versa) in the temporal domain.

Figure 3B:
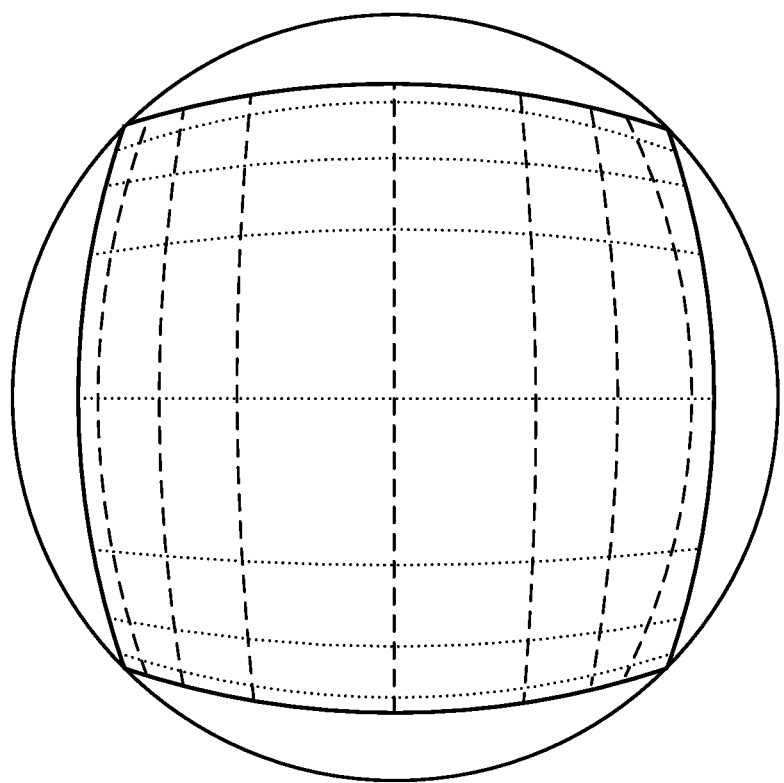
FIG. 3B shows an example non-uniform spherical sampling for CMP.
Figure 3A:
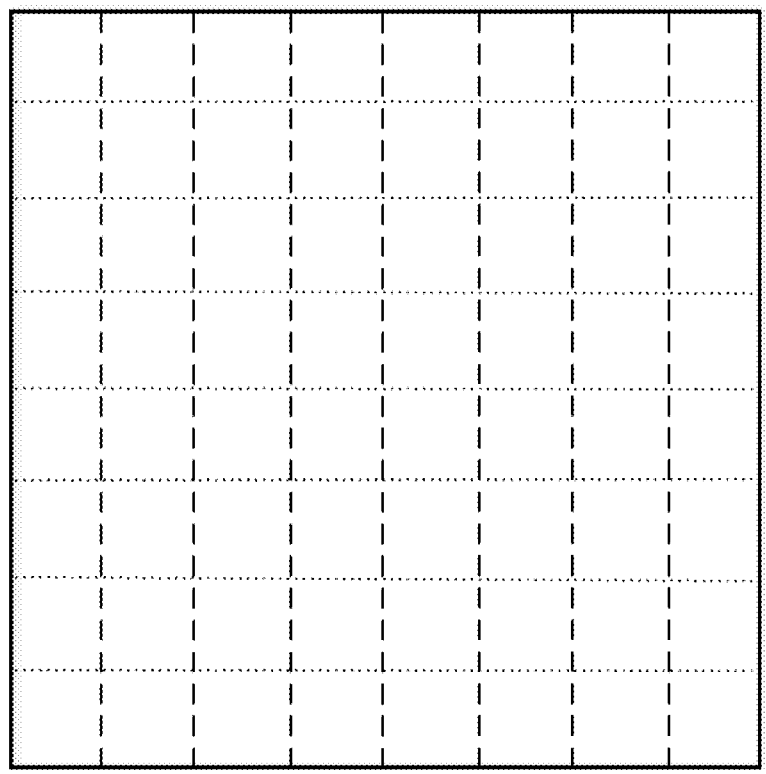
FIG. 3A shows an example uniform sampling of a cube face for CMP.
Figure 3D:
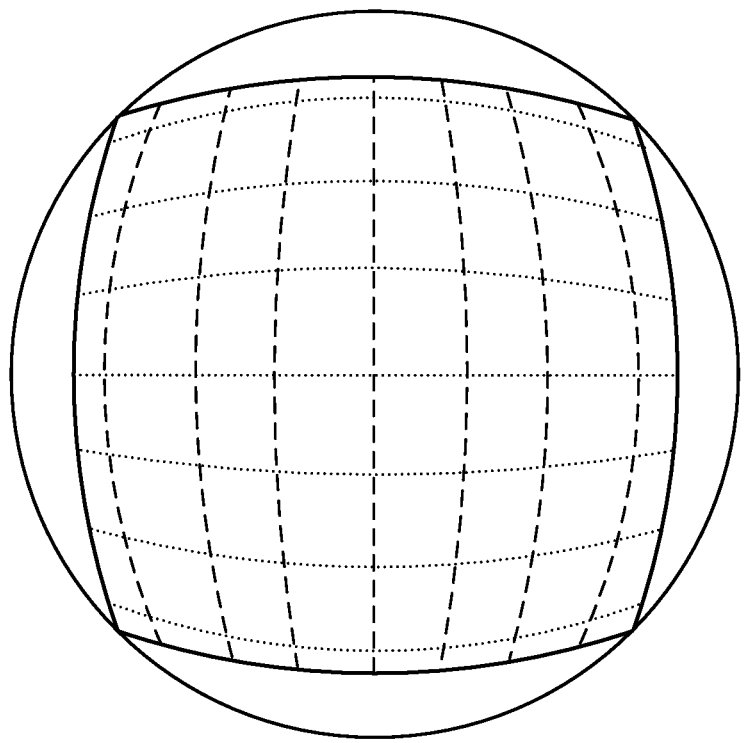
FIG. 3D shows an example uniform spherical sampling for UNICMP.
Figure 3C:
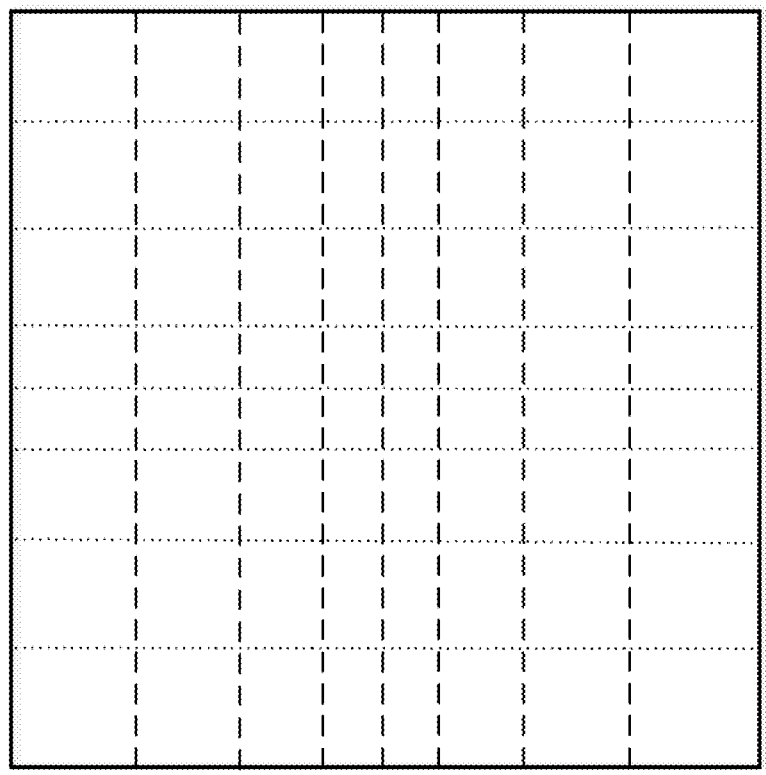
FIG. 3C shows an example non-uniform sampling of a cube face for UNICMP.

A unicube map projection (UNICMP) format may be performed. The UNICMP may convert a sampling grid of the CMP into a uniform sampling grid on the sphere. The UNICMP may use a transform function to modify the coordinate of the samples on a 2D planar face, e.g., before the actual UNICMP faces are generated. The UNICMP may achieve a better representation of spherical data than the CMP, for example, due to the uniform spherical sampling. The UNICMP may have an enhanced coding efficiency of 360-degree video, in relation to the CMP. FIG. 3 shows an example comparison of the planar and spherical sampling patterns between CMP and UNICMP. As shown in FIG. 3A, the sampling grid of a CMP face may include one or more (e.g., two) sets of parallel lines. One set of the parallel lines may be in horizontal direction and/or another set of parallel lines may be in vertical direction. A set of parallel partitioning lines may be separated with uniform interval. When the CMP face is projected onto the sphere, the sampling grid may be distorted where the straight lines in the planar face become curves, as shown in FIG. 3B. Because rectilinear projection may not be a distance-preserving projection, the corresponding sampling grid on the sphere may become non-uniform, as shown in FIG. 3B. To maintain a similar sampling structure as CMP, a face in UNICMP format may be sampled based on one or more (e.g., two) sets of parallel lines. In order to improve the spherical sampling uniformity, the parallel lines in a set may be distributed in a non-uniform way (e.g., FIG. 3C), such that the corresponding sampling grid on the sphere may be uniform (e.g., as shown in an example on FIG. 3D).

Figure 4B:
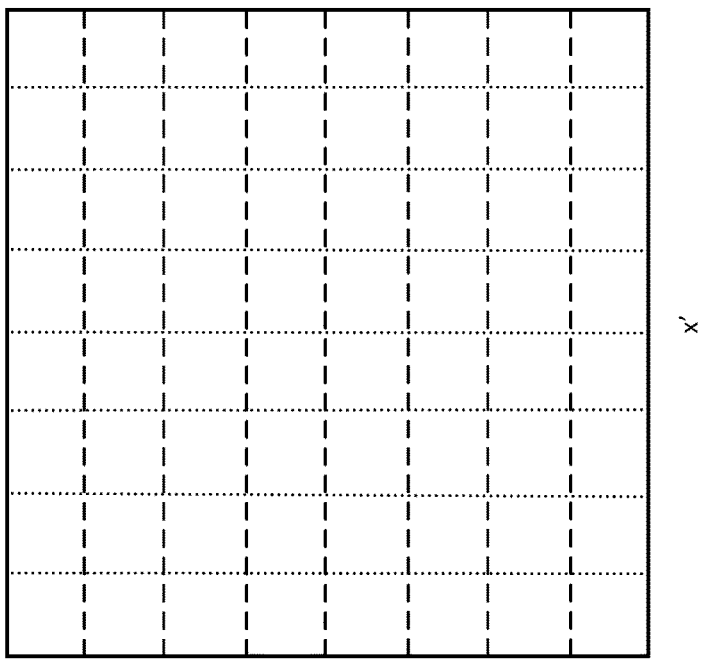
FIG. 4B shows an example mapping from the uniform partition grid of a unicube face to the non-uniform partition grid of a cube face.
Figure 4A:
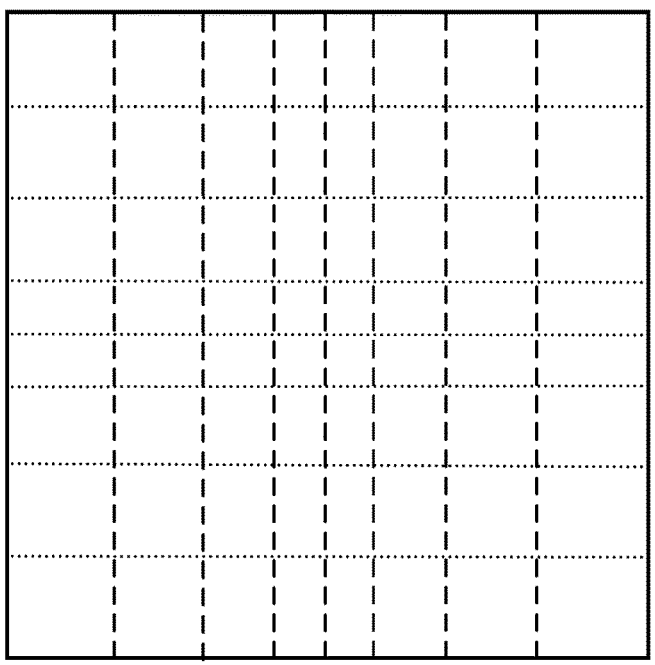
FIG. 4A shows an example mapping from the non-uniform partition grid of a cube face to the uniform partition grid of a unicube face.

A transform function may be used to transform the non-uniform planar sampling grid into a uniform planar sampling grid. FIG. 4 shows an example mapping. If the horizontal and vertical transforms are uncorrelated, the mapping from (x, y) to (x', y') may include two separate transforms, e.g., x'=f(x) and y'=f(y), where the same transform function may be applied on x and y independently. It may be possible to compute the inverse transform which maps (x', y') to (x, y), e.g., x=g(x') and y=g(y'). As the two transform functions of x and y may be identical, the derivation of the transform functions of y may be discussed herein.

Figure 5B:
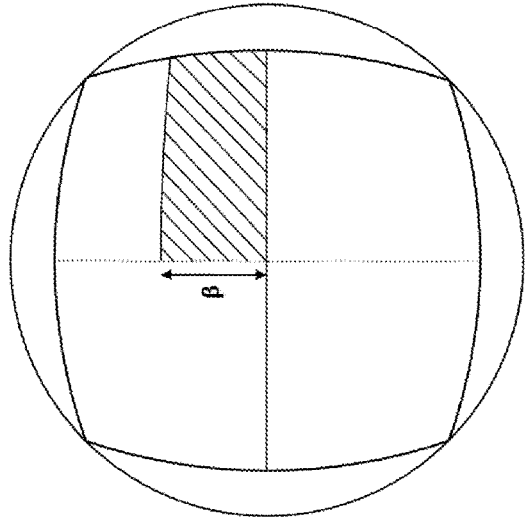
FIG. 5B shows an example corresponding uniform partition on the sphere.
Figure 5C:
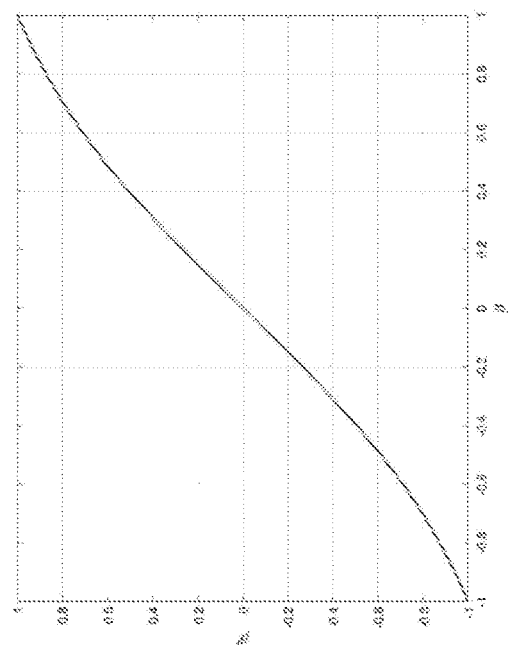
FIG. 5C shows an example transform function between the coordinate of cube face β and the coordinate of unicube face β'.
Figure 5A:
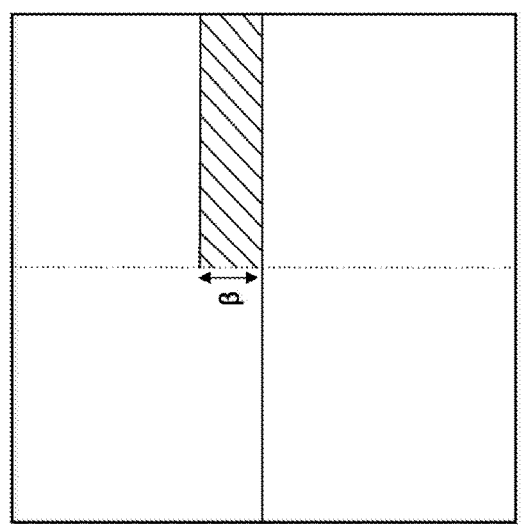
FIG. 5A shows an example non-uniform partition on the cube face.

Coordinate $\beta \in [-1,1]$ may be the y coordinate of the pattern area on the cube. FIG. 5 illustrates an example of how to calculate the transform functions between the coordinate of cube face and the coordinate of unicube face. As the transform function $\beta'=f(\beta)$ targets at converting $\beta$ to $\beta'$ with equal rectilinear structure partitioning on the sphere (e.g., as shown in FIG. 4B), f($\beta$) may be made proportional to the area of the spherical region corresponding to $\beta$. As illustrated in FIG. 5B, the value of f($\beta$) may be equal to the ratio between the area of the pattern spherical region and that of the quarter of the sphere corresponding to a cubemap face. The transform function f($\beta$) may be calculated as:

$$\beta' = f(\beta) = \frac{6}{\pi} \sin^{-1}\left(\frac{\beta}{\sqrt{2\beta^2 + 2}}\right) \quad (1)$$

where $\beta \in [-1,1]$. The corresponding inverse transform function g($\beta'$) (e.g., the mapping from the unicube face to cube face), may be calculated as:

$$\beta = g(\beta') = \frac{\sin(\frac{\pi}{6}\beta')}{\sqrt{\frac{1}{2} - \sin^2(\frac{\pi}{6}\beta')}} \quad (2)$$

where $\beta' \in [-1,1]$. FIG. 5C illustrates an example corresponding mapping relationship between $\beta$ and $\beta'$.

An equi-angular cubemap (EAC) projection may be performed by converting the coordinates between the CMP domain and the EAC domain, for example, based on the tangent of the angle of a spherical sample on the cube sampling grid. The coordinates in the CMP domain may be adjusted using a pair of f ( ) and g ( ) functions. For example, the transform functions for the EAC projection may be calculated as:

$$\beta' = f(\beta) = \frac{4}{\pi}\tan^{-1}(\beta) \quad (3)$$

$$\beta = g(\beta') = \tan(\frac{\pi}{6}\beta') \quad (4)$$

For example, an adjusted cubemap projection (ACP) may be performed for an improved spherical sampling uniformity by adjusting the coordinates in the CMP domain based on the following transform functions:

$$\beta' = f(\beta) = \text{sgn}(\beta) \cdot (-0.36 \cdot \beta^2 + 1.36 \cdot |\beta|) \quad (5)$$

$$\beta = g(\beta') = \text{sgn}(\beta') \cdot \frac{0.34 - \sqrt{0.34^2 - 0.09 \cdot |x|}}{0.18} \quad (6)$$

where sgn(·) may be the function which returns the sign of the input value.

Figure 6:
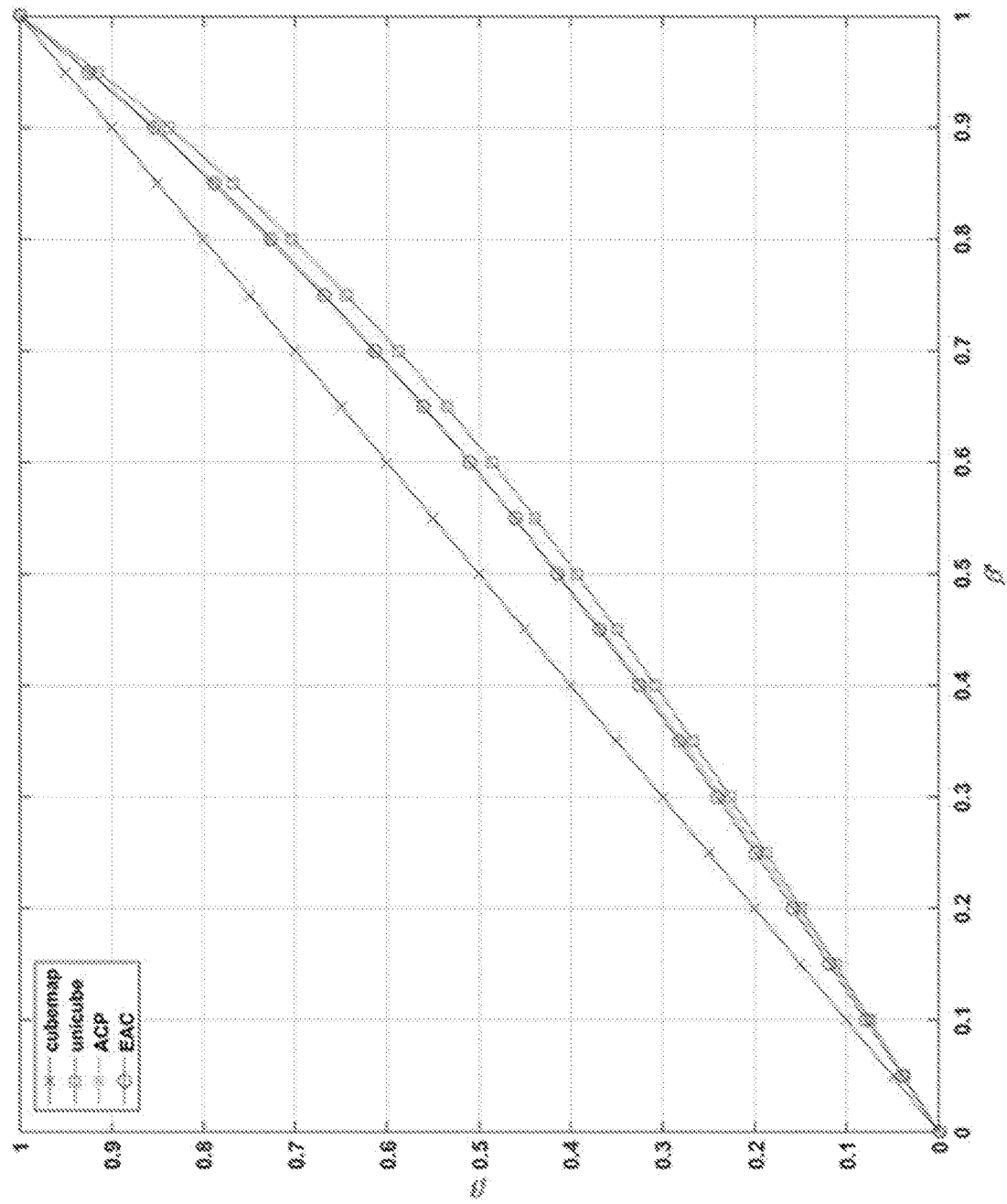
FIG. 6 shows an example of the transform function from the partition grid of CMP, UNICMP, ACP and EAC.
Figure 7A:
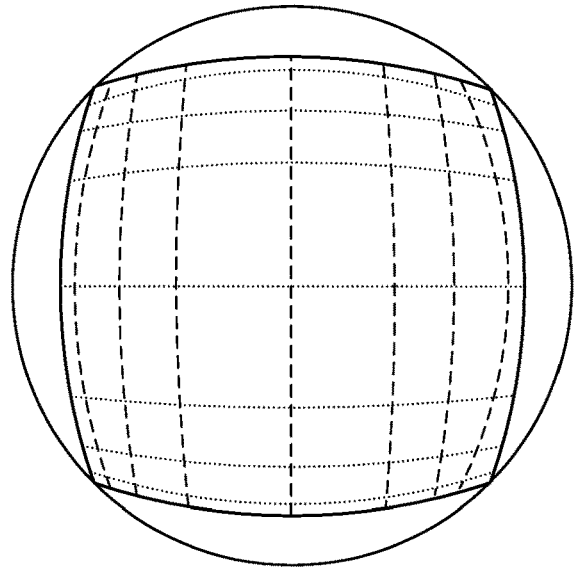
FIG. 7A shows an example of the spherical sampling grid of a CMP.
Figure 7B:
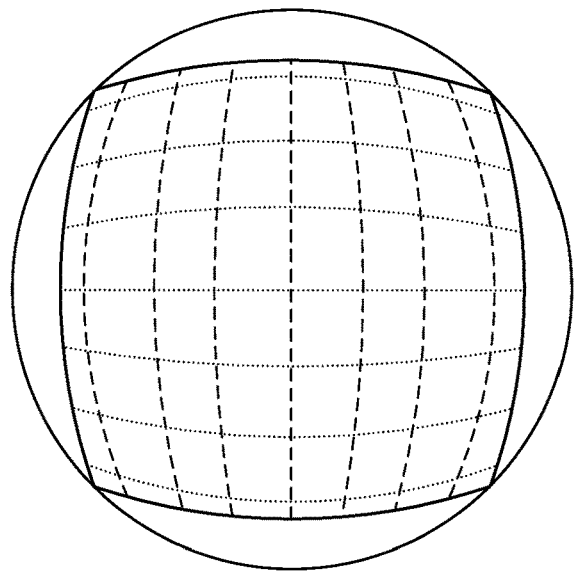
FIG. 7B shows an example of the spherical sampling grid of a UNICMP.
Figure 7C:
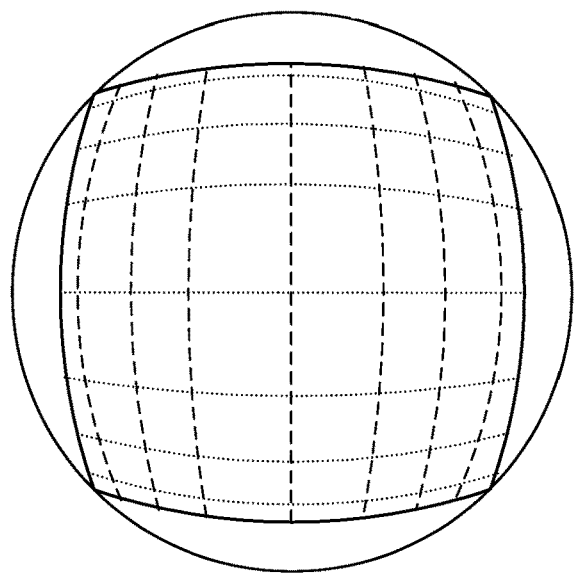
FIG. 7C shows an example of the spherical sampling grid of an EAC.

FIG. 6 shows an example comparison of the transform function from the partition grid of CMP, UNICMP, ACP, and EAC. As shown in FIG. 6, the transform functions of the CMP, the UNICMP, and the EAC may show distinctive spherical sampling features depending on the positions within a face. For example, the spherical sampling density of the CMP may be the highest at the face boundary, while the spherical sampling density of the CMP may become the lowest at the face center. The spherical sampling density of the UNICMP may be higher than that of the CMP and the EAC at the face centers. The situation may be reversed at the face boundaries. FIG. 7 shows the corresponding spherical sampling grids of the CMP (e.g., FIG. 7A), the UNICMP (e.g., FIG. 7B), and the EAC (e.g., FIG. 7C), respectively. The transform function of the ACP may be similar to that of EAC, e.g., at the regions around the boundaries and/or the center of a face. ACP may approximate the non-linear operations used in EAC's transform functions with second-order polynomial models to reduce implementation complexity. The ACP's sampling grid may be similar to the EAC.

Sampling densities on the sphere may depend on the projection format used to represent 360-degree video. Samples on the 2D projection picture may correspond to sampling densities (e.g. different) on the sphere. For example, the sampling density may be higher at the boundaries of the faces than at the centers of the faces. A weighted to spherically uniform PSNR (WS-PSNR) may measure spherical video quality in the projection domain, for example, by assigning weights (e.g. different) to the samples on the 2D projection plane. Weight value for a sample may be dependent on the corresponding area that the sample covers on the sphere. For example, for the CMP, the weight may be calculated according to:

$$w_{(x,y)} = \frac{1}{\left\{1 + 4 \cdot \left[\left(\left(x + \frac{1}{2} - \frac{W_f}{2}\right)/W_f\right)^2 + \left(\left(y + \frac{1}{2} - \frac{H_f}{2}\right)/H_f\right)^2\right]\right\}^{3/2}} \quad (7)$$

where (x,y) may be the coordinate of the sample within the corresponding CMP face that it belongs to; $W_f$ and $H_f$ may indicate the width and the height of the CMP face, respectively. Weights for a face may be derived for one or more other faces based on the symmetric characteristics of CMP.

Different 360-degree video projection formats may present distinct sampling features on the sphere. The WS-PSNR for the cubemap-based projection formats (e.g., the UNICMP, the ACP, and the EAC) may be calculated. The transform functions (e.g., as shown in (3) and (4)) may be used for the ACP faces, and the distribution of the WS-PSNR weights may be the same across the ACP faces. The weight values within a face may be calculated. For example, for a position (x, y) in an ACP face, the weight value $w^{acp}_{(x,y)}$ may be calculated as follows:

$$w^{acp}_{(x,y)} = \frac{(t_x^2 + t_y^2 + 1)^{-3/2}}{\sqrt{(1.36^2 - 1.44 * t_x) * (1.36^2 - 1.44 * t_y)}} \quad (8)$$

where $t_x$ and $t_y$ may be derived from the coordinate (x, y) as:

$$t_x = \frac{0.34 - \sqrt{0.34^2 - 0.09 * |2(x + 0.5)/W_f - 1|}}{0.18} \quad (9)$$

$$t_y = \frac{0.34 - \sqrt{0.34^2 - 0.09 * |2(y + 0.5)/H_f - 1|}}{0.18} \quad (10)$$

Parameters $W_f$ and $H_f$ may indicate the width and the height of the ACP face, respectively. FIG. 8A may show the weight map for the ACP format generated based on the equations (8) to (10), where dark samples may correspond to small weight values, and bright samples may correspond to large weight values.

As shown in FIG. 8A, the distribution of the weight values may be non-uniform. In particular, the weight values for the samples at the face boundaries may be smaller than that for the samples at face centers. The spherical sampling densities may be uneven within an ACP face. For example, the sampling density at face boundaries may be higher than that at face center. ACP may provide an uniform spherical sampling. An ACP face may be generated by adjusting the coordinate of the samples in the CMP domain through a transform function (e.g., before the actual CMP face is generated). The weight value of a sample in an ACP face may be derived from the weight value of its corresponding sample in the CMP face.

A parameter weight derivation (e.g., WS-PSNR weight derivation) for cubemap-style projections may be performed.

A parameter weight of a sample inside a face (e.g., a target face) may be calculated. In examples, a target face may be or may include at least one of an UNICMP face, an ACP face, an EAC face, and/or the like. The parameter weight (e.g., parameter weight value) of the corresponding sample in a reference face (e.g., a CMP face and/or the like) may be calculated. In examples, the weight value of the reference face (e.g., the parameter weight value of the CMP face) may be adjusted, e.g., based on the corresponding derivatives between the coordinates in the reference face (e.g., CMP face) and the target face. For example, (x', y') may be a coordinate in the target face (e.g., a coordinate associated with the sample in the target face), and (x, y) may be the corresponding coordinate in the CMP face (e.g., the corresponding coordinate associated with the sample in the CMP face). Coordinate (x, y) may be derived from (x', y') based on the transform functions x=g(x') and y=g(y'). The transform function g(·) may be obtained according to (2) for the UNICMP, (4) for the EAC, and (6) for the ACP. The value of the parameter weight (e.g., WS-PSNR weight) for a sample (e.g., the sample in a target face) may be proportional to the corresponding area that the sample covers on the sphere.

The sample area may be determined as follows:

$$Area_s = w_{tar}(x',y') \cdot |dx'||dy'| = w_{cube}(x,y) \cdot |dx||dy| \quad (11)$$

where $w_{tar}$ (x',y') and $w_{cube}$ (x,y) may indicate the weight values that are associated with the coordinate (x', y') in the target face and the coordinate (x, y) in the CMP face, respectively. Coordinate values x and y may be associated with the transform function. For example, the coordinate values x and y may be the functions of x' and y', e.g., x=g(x') and y=g(y'). Derivatives dx and dy may be computed. For example, derivatives dx and dy may be computed with respective to dx' and dy' as follows:

$$dx = \frac{\partial g(x')}{\partial x'} \cdot dx', \, dy = \frac{\partial g(y')}{\partial y'} \cdot dy' \quad (12)$$

The derivative values of the transform functions may be associated with a sample(s) for horizontal coordinate and/or vertical coordinate.

A parameter weight for the target face may be calculated based on the calculated derivatives (e.g., using (12)) and the parameter weight for the reference face (e.g., using an area associated with the coordinate values in the reference face). For example by substituting (12) into (11), the value of $w_{tar}$ (x',y') may be calculated as:

$$w_{tar}(x', y') = w_{cube}(x, y) \cdot \left| \frac{\partial g(x')}{\partial x'} \right| \left| \frac{\partial g(y')}{\partial y'} \right| \quad (13)$$

A parameter weight derivation (e.g., WS-PSNR weight derivation) for cubemap-style projections may be performed using one or more of the following: performing a coordinate conversion from a target face to a reference face (e.g., a CMP face); calculating a weight value in the reference face (e.g., the CMP face); and/or calculating a weight value in the target face.

As shown in (13), the weight value of a sample in the target face may be calculated. Coordinate conversion from the target face to the CMP face may be performed. For example, an input coordinate (x', y') in the target face may be identified. Given the input coordinate (x', y') in the target face, the corresponding coordinate (x, y) in the CMP face may be calculated based on the transform functions x=g(x') and y=g(y'). The weight value (e.g., parameter weight value) in the CMP face may be calculated. For example, given the intermediate coordinate (x, y), the corresponding weight value $w_{cube}$ (x,y) may be calculated according to (7). The weight value (e.g., parameter weight value) in the target face may be calculated. For example, given the weight value $w_{cube}$ (x,y) in the CMP face, the weight value $w_{tar}$ (x',y') in the target face may be derived by multiplying the value of $w_{cube}$ (x,y) with the derivatives between the horizontal and vertical coordinates in the target face and the CMP face, e.g., based on (13). In examples, a derivative value(s) of the transform function at a horizontal coordinate and/or a vertical coordinate may be associated with the target sampling position.

The values of the derivatives in (13) may be adjusted based on the target cubemap-style projection formats (e.g., the UNICMP, the ACP, the EAC, or the like) to calculate the WS-PSNR weight values.

A weight parameter(s) (e.g., WS-PSNR weight(s)) for the UNICMP may be calculated.

Derivatives dx and dy may be calculated with respect to dx' and dy', as shown in (12). Calculating derivatives dx and dy, with respect to dx' and dy', may be performed based on the UNICMP-to-CMP transform function as shown in (2) as:

$$\frac{dx}{dx'} = \frac{\partial g(x')}{\partial x'} = \frac{\pi}{12} \cdot \quad (14)$$

$$\cos\left(\frac{\pi}{6} \cdot \left(\frac{2(x' + 0.5)}{W_f} - 1\right)\right)\left[0.5 - \sin^2\left(\frac{\pi}{6} \cdot \left(\frac{2(x' + 0.5)}{W_f} - 1\right)\right)\right]^{-\frac{3}{2}}$$

$$\frac{dy}{dy'} = \frac{\partial g(y')}{\partial y'} = \frac{\pi}{12} \cdot \quad (15)$$

$$\cos\left(\frac{\pi}{6} \cdot \left(\frac{2(y' + 0.5)}{H_f} - 1\right)\right)\left[0.5 - \sin^2\left(\frac{\pi}{6} \cdot \left(\frac{2(y' + 0.5)}{H_f} - 1\right)\right)\right]^{-\frac{3}{2}}$$

where $W_f$ and $H_f$ indicates the width and the height of the UNICMP face, accordingly. The weight parameters (e.g., WS-PSNR weights) for the UNICMP face may be calculated using the derivatives of the UNICMP face with respect to the derivatives of the CMP face and applying the determined derivatives to the weight parameter of the CMP face. For example by substituting (14) and (15) into (13), the weight parameters (e.g., WS-PSNR weights) for the UNICMP face may be calculated as:

$$w_{unicube}(x', y') = w_{cube}(x, y) \cdot \left| \frac{\partial g(x')}{\partial x'} \right| \left| \frac{\partial g(y')}{\partial y'} \right| = \quad (16)$$

$$\frac{1}{\left\{1 + 4 \cdot \left[\left(\left(x + \frac{1}{2} - \frac{W_f}{2}\right) / W_f\right)^2 + \left(\left(y + \frac{1}{2} - \frac{H_f}{2}\right) / H_f\right)^2\right]\right\}^{\frac{3}{2}}} \cdot$$

$$\left(\frac{\pi}{12}\right)^2 \cdot$$

$$\cos\left(\frac{\pi}{6} \cdot \left(\frac{2(x' + 0.5)}{W_f} - 1\right)\right)\left[0.5 - \sin^2\left(\frac{\pi}{6} \cdot \left(\frac{2(x' + 0.5)}{W_f} - 1\right)\right)\right]^{-\frac{3}{2}} \cdot$$

$$\cos\left(\frac{\pi}{6} \cdot \left(\frac{2(y' + 0.5)}{H_f} - 1\right)\right)\left[0.5 - \sin^2\left(\frac{\pi}{6} \cdot \left(\frac{2(y' + 0.5)}{H_f} - 1\right)\right)\right]^{-\frac{3}{2}}$$

A weight parameter(s) (e.g., WS-PSNR weights) for the EAC may be calculated. The value of dx and dy for the EAC may be calculated based on (4) as follows:

$$\frac{dx}{dx'} = \frac{\partial g(x')}{\partial x'} = \frac{\pi}{4} \cdot \left[\cos\left(\frac{\pi}{4} \cdot \left(\frac{2(x' + 0.5)}{W_f} - 1\right)\right)\right]^{-2} \quad (17)$$

$$\frac{dy}{dy'} = \frac{\partial g(y')}{\partial y'} = \frac{\pi}{4} \cdot \left[\cos\left(\frac{\pi}{4}\left(\frac{2(y' + 0.5)}{H_f} - 1\right)\right)\right]^{-2} \quad (18)$$

where $W_f$ and $H_f$ indicate the width and the height of the EAC face, respectively. The weight parameters (e.g., weight values) derived for the sample coordinate (x', y') at an EAC face may be calculated. For example, by substituting (17) and (18) into (13), the weight parameter (e.g., weight values and/or WS-PSNR weights) for the EAC face may be calculated as follows:

$$w_{eac}(x', y') = w_{cube}(x, y) \cdot \left| \frac{\partial g(x')}{\partial x'} \right| \left| \frac{\partial g(y')}{\partial y'} \right| = \quad (19)$$

$$\frac{1}{\left\{1 + 4 \cdot \left[\left(\left(x + \frac{1}{2} - \frac{W_f}{2}\right) / W_f\right)^2 + \left(\left(y + \frac{1}{2} - \frac{H_f}{2}\right) / H_f\right)^2\right]\right\}^{\frac{3}{2}}} \cdot$$

$$\left(\frac{\pi}{4}\right)^2 \cdot \left[\cos\left(\frac{\pi}{4} \cdot \left(\frac{2(x' + 0.5)}{W_f} - 1\right)\right)\right]^{-2} \cdot$$

$$\left[\cos\left(\frac{\pi}{4}\left(\frac{2(y' + 0.5)}{H_f} - 1\right)\right)\right]^{-2}$$

A weight parameter(s) (e.g., WS-PSNR weights) for the ACP may be calculated. Based on the transform function from the ACP domain to the CMP domain (e.g., (6)), the value of dx and dy in (12) may be derived as follows:

$$\frac{dx}{dx'} = \frac{\partial g(x')}{\partial x'} = \frac{1}{4 \cdot \sqrt{0.34^2 - 0.09 \cdot |2(x'+0.5)/W_f - 1|}} \quad (20)$$

$$\frac{dy}{dy'} = \frac{\partial g(y')}{\partial y'} = \frac{1}{4 \cdot \sqrt{0.34^2 - 0.09 \cdot |2(y'+0.5)/H_f - 1|}} \quad (21)$$

where $W_f$ and $H_f$ may indicate the width and the height of the ACP face, respectively. The weight parameters (e.g., WS-PSNR weights) for the ACP face may be calculated using the derivatives of the UNICMP face with respect to the derivatives of the CMP face (e.g., (20) and/or (21)) and applying the determined derivatives to the weight parameter of the CMP face. For example taking (20) and (21) into (13), the weight value of the sample at coordinate (x', y') in an ACP face may be calculated as follows:

$$w_{acp}(x', y') = w_{cube}(x, y) \cdot \left|\frac{\partial g(x')}{\partial x'}\right|\left|\frac{\partial g(y')}{\partial y'}\right| = \frac{1}{\left\{1 + 4 \cdot \left[\left(\left(x + \frac{1}{2} - \frac{W_f}{2}\right)/W_f\right)^2 + \left(\left(y + \frac{1}{2} - \frac{H_f}{2}\right)/H_f\right)^2\right]\right\}^{\frac{3}{2}}} \cdot \frac{1}{16 \cdot \left[\sqrt{0.34^2 - 0.09 \cdot \left|\frac{2(x'+0.5)}{W_f} - 1\right|} \cdot \sqrt{0.34^2 - 0.09 \cdot \left|\frac{2(y'+0.5)}{H_f} - 1\right|}\right]} \quad (22)$$

Figure 8B:
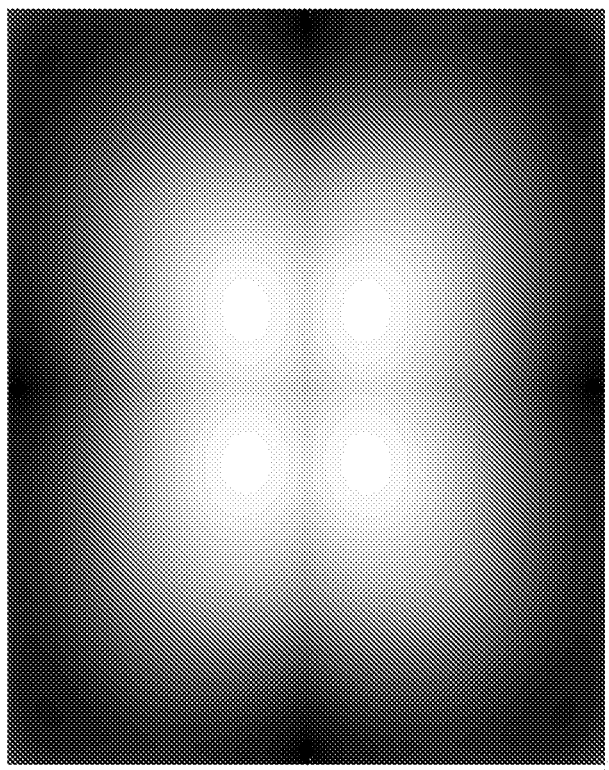
FIG. 8B shows an example of the weight maps for an ACP format generated by an example weight calculation.
Figure 8A:
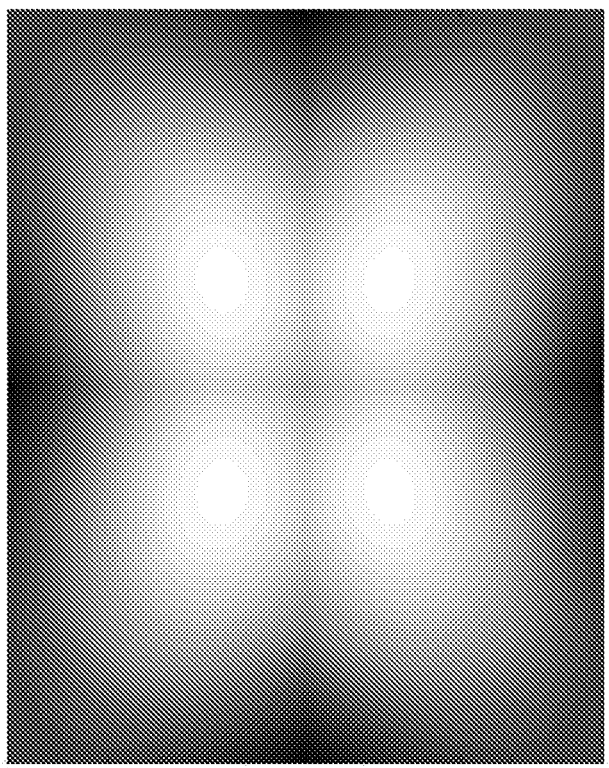
FIG. 8A shows an example of the weight maps for an ACP format generated by an example weight calculation.

FIG. 8B shows an example weight map generated using the WS-PSNR weight calculation described herein. As shown, the weigh values within an ACP face may be uniform (e.g., substantially uniform). Although in the examples described herein, a same transform function is used in both directions (e.g., g(x) and g(y) may be the same), a person skilled in the art may appreciate that one or more different transform functions may be applied in two directions.

A weight parameter(s) (e.g., WS-PSNR weights) for the hybrid cubemap projection (HCP) may be performed. HCP may be a cubemap-like projection format with 6 faces. To convert between CMP and HCP, one or more transform functions may be used to map the coordinates. HCP's transform functions may use a variable parameter(s). The parameters for the horizontal and vertical transform functions may be different. Coordinate conversion between HCP and CMP may be performed using the following horizontal and vertical transform functions:

$$x' = f_X(x) = \text{sgn}(x) \cdot (a_2 \cdot x^2 + a_1 \cdot |x|) \quad (23)$$

$$y' = f_Y(y) = \text{sgn}(y) \cdot (b_2 \cdot y^2 + b_1 \cdot |y|) \quad (24)$$

$$x = g_X(x') = \text{sgn}(x') \cdot \frac{-a_1 + \sqrt{a_1^2 + 4a_2 \cdot |x'|}}{2a_2} \quad (25)$$

$$y = g_Y(y') = \text{sgn}(y') \cdot \frac{-b_1 + \sqrt{b_1^2 + 4b_2 \cdot |y'|}}{2b_2} \quad (26)$$

The derivatives may be derived. For example, derivatives may be derived as:

$$\frac{\partial g_X(x')}{\partial x'} = \frac{1}{\sqrt{a_1^2 + 4a_2 \cdot |2(x'+0.5)/W_f - 1|}} \quad (27)$$

$$\frac{\partial g_Y(y')}{\partial y'} = \frac{1}{\sqrt{b_1^2 + 4b_2 \cdot |2(y'+0.5)/H_f - 1|}} \quad (28)$$

where $W_f$ and $H_f$ may indicate the width and the height of the ACP face, respectively. The derivative values the transform functions may be associated with a sample(s) for horizontal coordinate and/or vertical coordinate. Based on equations (27) and (28), the weight value of the sample at coordinate (x', y') in a HCP face may be calculated as follows:

$$w_{hcp}(x', y') = w_{cube}(x, y) \cdot \left|\frac{\partial g_X(x')}{\partial x'}\right|\left|\frac{\partial g_Y(y')}{\partial y'}\right| = \frac{1}{\left\{1 + 4 \cdot \left[\left(\left(x + \frac{1}{2} - \frac{W_f}{2}\right)/W_f\right)^2 + \left(\left(y + \frac{1}{2} - \frac{H_f}{2}\right)/H_f\right)^2\right]\right\}^{\frac{3}{2}}} \cdot \frac{1}{\left[\sqrt{a_1^2 + 4a_2 \cdot \left|\frac{2(x'+0.5)}{W_f} - 1\right|} \cdot \sqrt{b_1^2 + 4b_2 \cdot \left|\frac{2(y'+0.5)}{H_f} - 1\right|}\right]} \quad (29)$$

The encoder may search for HCP horizontal and vertical transform function parameters (e.g., $a_1$, $a_2$, $b_1$, and $b_2$) (e.g., optional HCP horizontal and vertical transform function parameters) based on the input video content. The parameters $a_1$, $a_2$, $b_1$, and $b_2$ may be quantized and signaled in a bitstream to a decoder.

WS-PSNR weight derivation for a projection format may be performed.

The weight calculation described herein may be applied. For example, the weight calculation described herein may be applied to the derivation of the weight parameter(s) (e.g., weight value(s) for a given projection format that is generated from another projection format by adjusting the sample coordinates within a face through a transform function. For example, (x', y') may be the coordinate of a sample in the target face, and (x, y) may be the coordinate of its corresponding sample in the source face, where the target face is generated from. The transform function from (x', y') to (x, y) may be:

$$x = g_h(x', y') \quad (30)$$

$$y = g_v(x', y') \quad (31)$$

The ACP and the EAC, in (30) and (31), the horizontal and vertical transforms may be performed jointly. For example, x and y may be the functions of both x' and y'. The transform functions that are applied for the horizontal and vertical coordinates may be different. To compute the spherical area that the sample coordinate (x, y) corresponds to, derivatives dx and dy may be calculated. The partial derivatives may be computed, and the total derivatives may be calculated as follows:

$$dx = \frac{\partial g_h}{\partial x'} \cdot dx' + \frac{\partial g_h}{\partial y'} \cdot dy' \quad (32)$$

$$dy = \frac{\partial g_v}{\partial x'} \cdot dx' + \frac{\partial g_v}{\partial y'} \cdot dy' \quad (33)$$

The norms of dx and dy may be determined as follows:

$$|dx| = \sqrt{\left(\frac{\partial g_h}{\partial x'}\right)^2 \cdot (dx')^2 + \left(\frac{\partial g_h}{\partial y'}\right)^2 \cdot (dy')^2} \quad (34)$$

$$|dy| = \sqrt{\left(\frac{\partial g_v}{\partial x'}\right)^2 \cdot (dx')^2 + \left(\frac{\partial g_v}{\partial y'}\right)^2 \cdot (dy')^2} \quad (35)$$

The Euclidean norms of dx' and dy' may be equal, and (34) and (35) may be simplified as:

$$|dx| = \sqrt{\left(\frac{\partial g_h}{\partial x'}\right)^2 + \left(\frac{\partial g_h}{\partial y'}\right)^2} \cdot |dx'| \quad (36)$$

$$|dy| = \sqrt{\left(\frac{\partial g_v}{\partial x'}\right)^2 + \left(\frac{\partial g_v}{\partial y'}\right)^2} \cdot |dy'| \quad (37)$$

Taking (36) and (37) to (13), the weight value for the sample (x', y') in the target face (e.g., $w_{tar}(x', y')$) from the weight value of its correspondence sample (x, y) in the source face (e.g., $w_{source}(x, y)$) may be calculated as follows:

$$w_{tar}(x', y') = \quad (38)$$

$$w_{source}(x, y) \cdot \sqrt{\left(\frac{\partial g_h}{\partial x'}\right)^2 + \left(\frac{\partial g_h}{\partial y'}\right)^2} \cdot \sqrt{\left(\frac{\partial g_v}{\partial x'}\right)^2 + \left(\frac{\partial g_v}{\partial y'}\right)^2}$$

WS-PSNR may measure the quality (e.g., fidelity to an original signal) of a reconstructed 360-degree video. The WS-PSNR may be calculated for 360-degree video in EAC, ACP, UNICMP, HCP, and/or other cubemap-like projection format(s).

Block-level quantization parameter (QP) offsets may be calculated for 360-degree video coding. In examples, the block-level QP offsets may be calculated based on the determined weight parameter(s) (e.g., WS-PSNR weights) within the block described herein. In examples, the block-level QP offsets may be calculated based on the spherical sampling density of the block. The determined weight parameters (e.g., WS-PSNR weights) may be used to derive the block-level QP offsets for 360-degree video coding.

Figure 9:
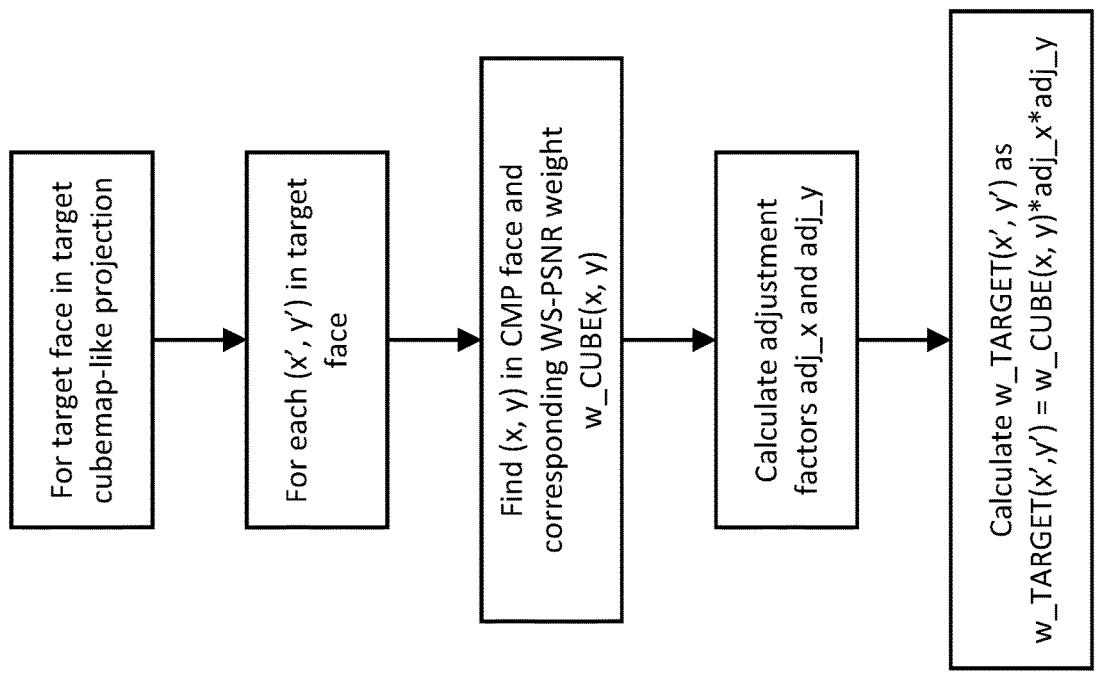
FIG. 9 shows an example of calculating WS-PSNR for cube-map like projection formats.

FIG. 9 shows an example for calculating the WS-PSNR values. Here, the cubemap-like projection format may be the target projection format. The adjustments (e.g., adj_x and/or adj_y) may be calculated according to the equations described herein for different cubemap-like projection formats. Note that although FIG. 9 shows that the WS-PSNR values may be calculated for a position (e.g., each position) in a face (e.g., each face), it is contemplated that symmetric properties may be used so that a portion of the coordinates may be derived. For example, for UNICMP, EAC, and ACP, weights for a face may be calculated and may be reused for one or more other faces. For HCP, the transform function parameters may be signaled within a bitstream for the faces. The decoder may examine which faces share the transform function parameters (e.g., same transform function parameters), and may derive the weights for one (e.g. only one) of those faces with the same transform function parameters.

A constraint may be applied to the faces within the same row in a CMP (e.g., 3×2 configuration shown in FIG. 2B) having continuous texture across faces. For example, constraints may be applied such that the vertical transform function for one or more faces (e.g., three faces) in the top face row (or the bottom face row) are the same. For this constrained HCP format, the adj_y in FIG. 9 may be calculated for a face (e.g., one face) and may be reused for the other faces in the same face row (e.g., top or bottom face row). Though not shown in FIG. 9, symmetry within a face may be used (e.g., used to reduce computation). For example cubemap-like projection formats described herein (e.g., UNICMP, EAC, ACP, and/or HCP), the weight parameter(s) may be calculated for a portion of a face, such as ¼ of a face. The weights for the remaining portion (e.g., ¾ of the face) may be derived by mirroring those from the ¼ of the face.

Projection formats may be static within a video sequence. For example, a projection format may persist for a period of time, e.g., the entire video sequence, or one or more intra random access periods (IRAP). The weight parameter(s) (e.g., WS-PSNR weight(s)) may be calculated (e.g., calculated once) and may be used for multiple pictures. The decoder may parse the coding projection format from the bitstream when the projection format used to code the 360-degree video is signaled as part of the bitstream. The decoder may parse an additional transform function parameter(s), such as the parameter(s) used in HCP when projection format used to code the 360-degree video is signaled as part of the bitstream. Based on the coding projection format and transform function parameter(s) (if any), the decoder may calculate the weight parameter(s) (e.g., WS-PSNR weight(s)) periodically. For example, the decoder may calculate the WS-PSNR weights once per sequence, or once per IRAP. The derived weight parameter(s) (e.g., WS-PSNR weight(s)) may be used to perform block-level QP offset adjustment, quality evaluation, and/or other decoding functionalities.

As shown in (13), the derivatives $$\left(\text{e.g., } \left|\frac{\partial g(x')}{\partial x'}\right| \left|\frac{\partial g(y')}{\partial y'}\right|\right)$$

may be calculated based on the transform function that converts the target cubemap projection coordinates (x', y')

into CMP projection coordinates (x, y), for example, g(β'). The derivatives may be calculated based on the transform function that converts the CMP projection coordinates (x, y) into the target cubemap projection coordinates (x', y'), for example, f(β). The calculation may be based on the following:

$$\frac{\partial g(x')}{\partial x'} = \frac{\partial x}{\partial x'} = \frac{1}{\frac{\partial x'}{\partial x}} = \frac{1}{\frac{\partial f(x)}{\partial x}} \quad (39)$$

Based on complexity of computation, a conversion, such as (13) or (39), may be selected to calculate the WS-PSNR weights.

The motion vectors (MVs) may be determined at an encoder and signaled to a decoder. The overhead used to code the MVs may account for a portion of the output bit-stream. One or more (e.g., multiple) decoder-side techniques may be applied (e.g., frame-rate up conversion (FRUC) and/or decoder-side motion vector refinement (DMVR)) to derive (e.g., completely derive) or refine (e.g., partially refine) the MVs at the decoder based on template matching. For example, one or more (e.g., multiple) decoder-side techniques may be applied to completely derive or partially refine the MVs at the decoder based on template matching using one or more samples in the template or bilateral matching. Template matching may use one or more samples in the template or bilateral matching using multiple predictors (e.g., two predictors). For example, two predictors may be or may include the reconstructed samples of spatial neighbors of the current block in the same decoded picture or the reconstructed samples of the previously decoded pictures in the temporal domain. The difference (e.g., sum of absolute difference (SAD)) between the template samples and its reference samples using a given MV may be measured, for example, $$D = \sum_{(x,y) \in B} SAD(I^{tmp}(x, y), I^{ref}(x, y)) \quad (40)$$

where $I^{tmp}(x, y)$ and $I^{ref}(x, y)$ may be the sample values of the template and its reference. B may indicate the set of samples in the template. SAD may be the sum of absolute difference. The MV that minimizes the SAD value may be selected as the MV (e.g., best MV) of the current block. For the bilateral matching, SAD may be calculated between the prediction in list0 and the prediction in list1 giving a candidate MV. List0 may be a prediction block that is generated from one or more reference samples from a reference picture(s) that precedes the current picture in display order. List1 may be a prediction block that is generated from one or more reference samples from a reference picture(s) that is after the current picture in display order.

When applying the decoder-side techniques described herein to 360-degree video coding, the samples on the 2D projection picture may correspond to different sampling densities on the sphere. SAD may not be reliable to derive the MV (e.g., optimal MV), as different samples on the 2D plane may have unequal impacts on the spherical distortion. In such case, the WS-PSNR weight calculation described herein may be applied to achieve an accurate distortion measurement by assigning different weights to samples on the 2D projection plane according to its spherical sampling density. For example, the following weighted SAD value (e.g., WD) may be applied to derive the MV (e.g., optimal MV), $$W_D = \sum_{(x,y) \in B} w(x, y) * SAD(I^{tmp}(x, y), I^{ref}(x, y)) \quad (41)$$

where w(x,y) may be the weight value that is applied to the sample coordinate (x, y). w(x,y) may be calculated based on (13) or (39) when cubemap-style projection is applied for coding 360-degree videos.

Figure 10A:
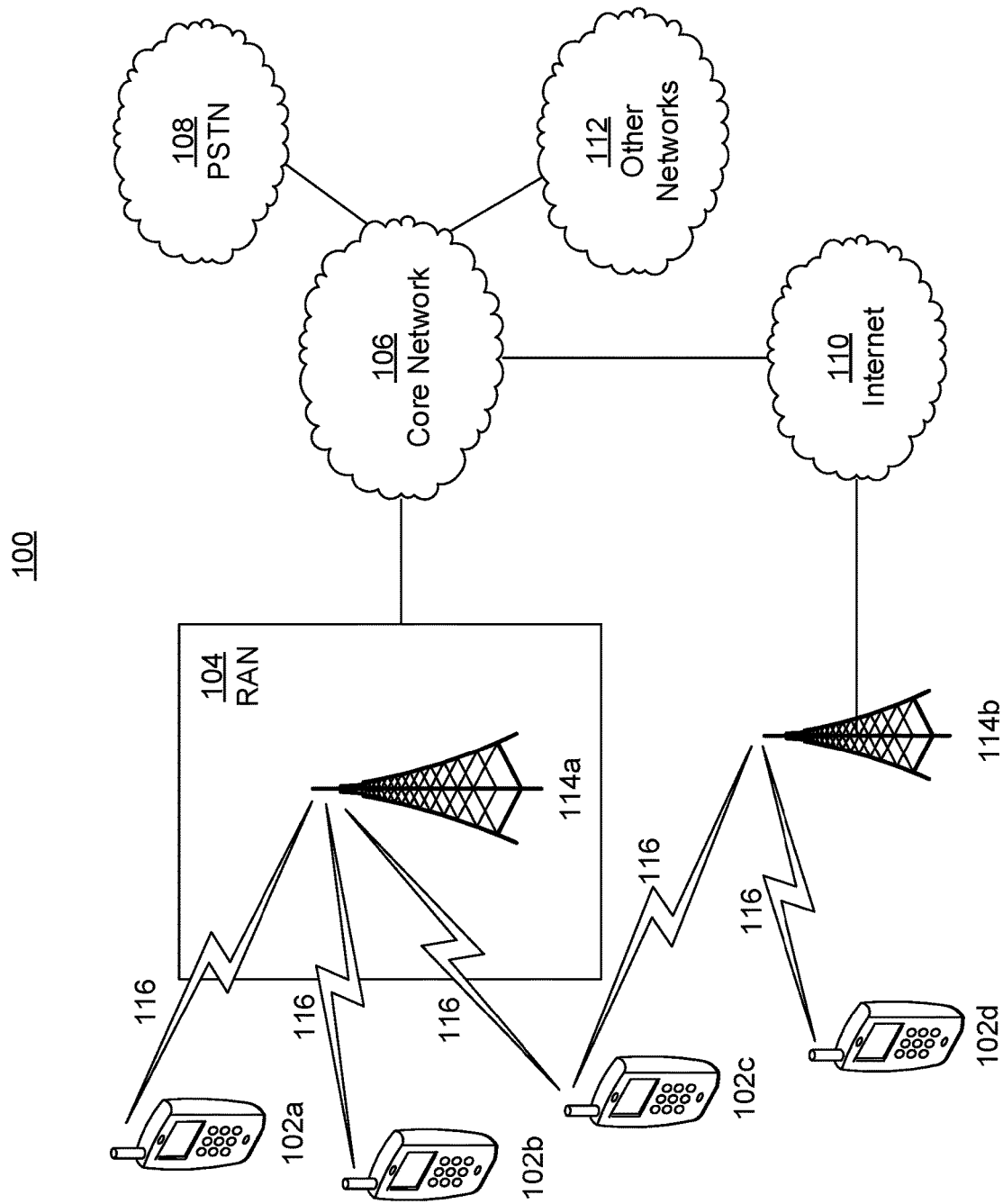
FIG. 10A is a system diagram illustrating an example communications system in which one or more disclosed embodiments may be implemented.

FIG. 10A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 10A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 10A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 10A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 10A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 10A may be configured to communicate with the base station 114a, which may employ a cellular-based radio technology, and with the base station 114b, which may employ an IEEE 802 radio technology.

Figure 10B:
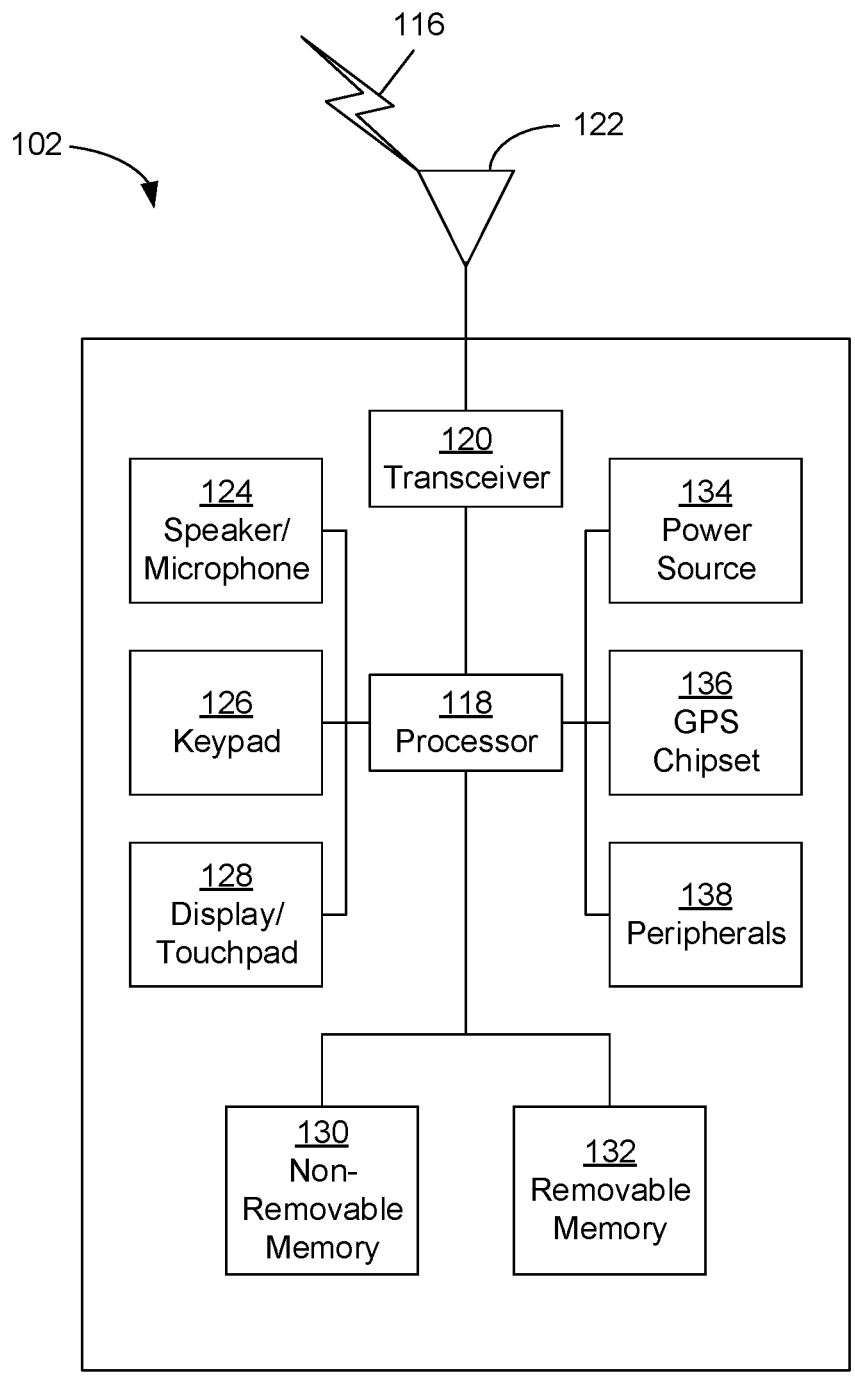
FIG. 10B is a system diagram illustrating an example wireless transmit/receive unit (WTRU) that may be used within the communications system illustrated in FIG. 10A according to an embodiment.

FIG. 10B is a system diagram illustrating an example WTRU 102. As shown in FIG. 10B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 10B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VRIAR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10C:
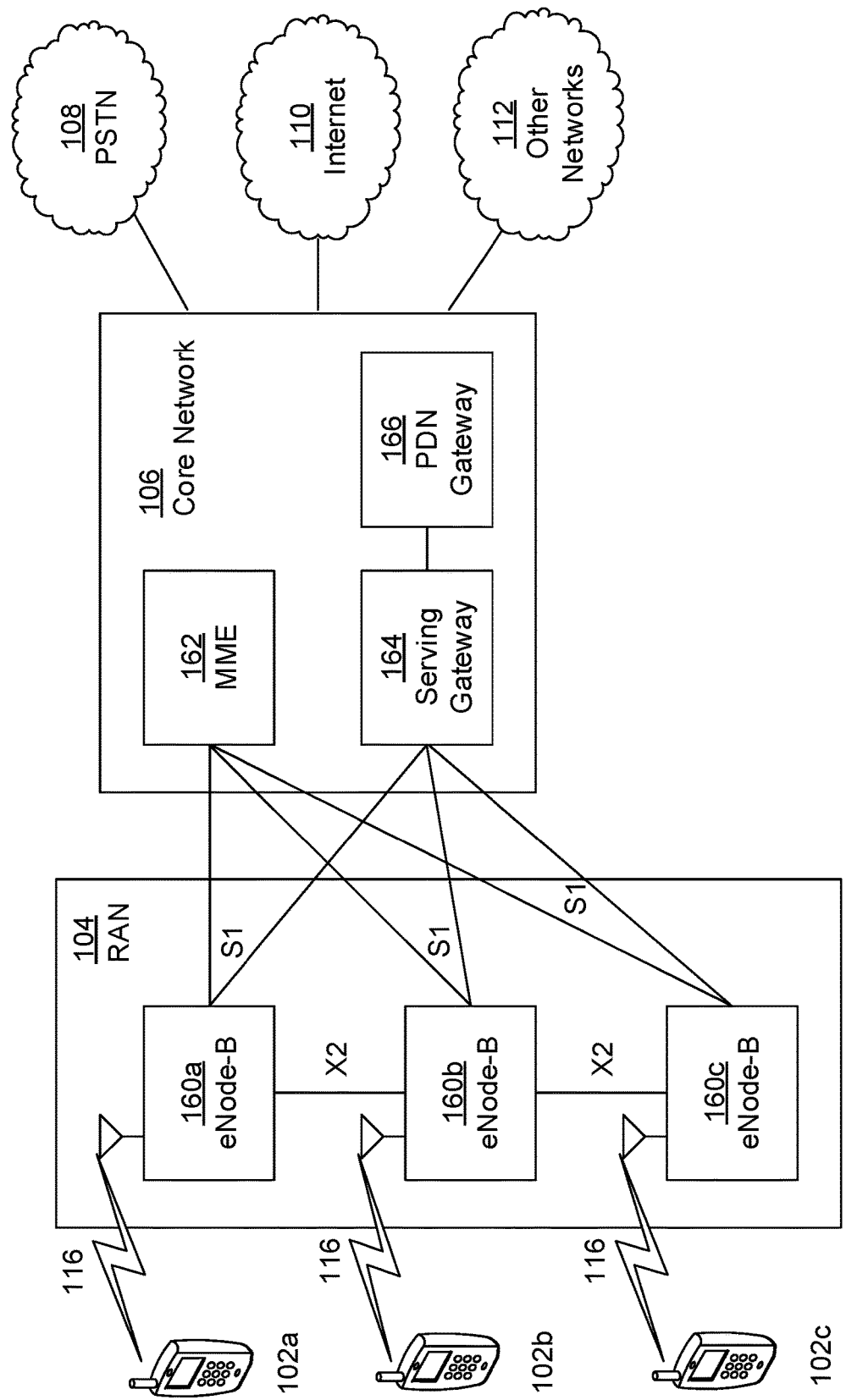
FIG. 10C is a system diagram illustrating an example radio access network (RAN) and an example core network (CN) that may be used within the communications system illustrated in FIG. 10A according to an embodiment.

FIG. 10C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10C, the eNode-Bs 160a, 160b, 160c may communicate with one another over an X2 interface.

The CN 106 shown in FIG. 10C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 10A-10D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMAICA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11 af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 10D:
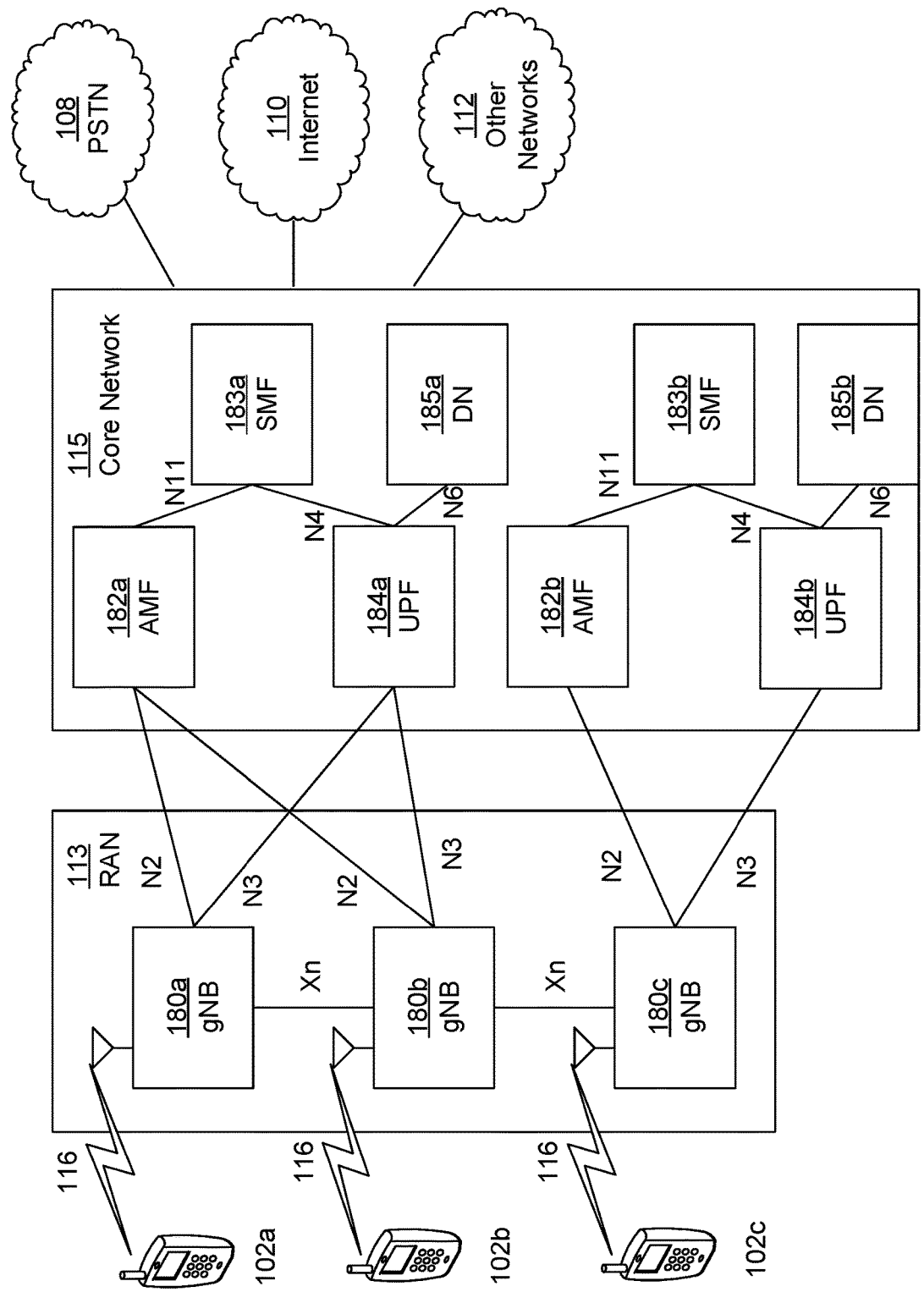
FIG. 10D is a system diagram illustrating a further example RAN and a further example CN that may be used within the communications system illustrated in FIG. 10A according to an embodiment.

FIG. 10D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 10D, the gNBs 180a, 180b, 180c may communicate with one another over an Xn interface.

The CN 115 shown in FIG. 10D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 10A-10D, and the corresponding description of FIGS. 10A-10D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for coding 360-degree video content, the method comprising:
   identifying a first sampling position in a first projection format and a second sampling position in a second projection format, the second sampling position relating to the corresponding first sampling position via a transform function;
   identifying a reference parameter weight for the first sampling position;
   determining an adjustment factor associated with the reference parameter weight for the first sampling position based on the transform function between the first sampling position and the second sampling position;
   calculating an adjusted parameter weight for the second sampling position based on the reference parameter weight for the first sampling position and the adjustment factor associated with the reference parameter weight for the first sampling position; and applying the adjusted parameter weight to the second sampling position in the second projection format when coding the 360-degree video content.

2. The method of claim 1, wherein the first projection format comprises a cube map projection (CMP) format, and the second projection format comprises at least one of an unicube map projection (UNICMP) format, an equi-angular cubemap (EAC) format, an adjusted cubemap projection (ACP) format, or a hybrid cubemap projection (HCP) format.

3. The method of claim 1, wherein the adjustment factor is determined based on a first derivative value of the transform function for a horizontal coordinate associated with at least one of the first sampling position or the second sampling position, and a second derivative value of the transform function for a vertical coordinate associated with at least one of the first sampling position or the second sampling position.

4. The method of claim 1, wherein the reference parameter weight is identified based on a location of the first sampling position in the first projection format.

5. The method of claim 1, wherein applying the adjusted parameter weight to the second sampling position in the second projection format further comprising:
determining a quantization parameter for a transform-coded portion of the 360-degree video content associated with the second sampling position in the second projection format based on the adjusted parameter weight.

6. The method of claim 1, wherein the reference parameter weight comprises a first weighted spherically uniform peak signal-to-noise ratio (WS-PSNR) weight and the adjusted parameter weight comprises a second WS-PSNR weight.

7. The method of claim 6, wherein applying the adjusted parameter weight to the second sampling position in the second projection format further comprising:
determining the second WS-PSNR weight for the second sampling position by adjusting the first WS-PSNR weight for the first sampling position using the adjustment factor.

8. The method of claim 1, wherein applying the adjusted parameter weight to the second sampling position in the second projection format further comprising:
determining at least one of a distortion or a quality measurement associated the second sampling position in the second projection format using the adjusted parameter weight.

9. The method of claim 1, wherein applying the adjusted parameter weight to the second sampling position in the second projection format further comprising:
determining a weighted sum of absolute difference (SAD) between the first sampling position and the second sampling position using the adjusted parameter weight.

10. The method of claim 1, wherein the transform function is defined by parameters received in a bitstream.

11. An apparatus for coding 360-degree video content, the apparatus comprising:
a processor configured to:
identify a first sampling position in a first projection format and a second sampling position in a second projection format, the second sampling position relating to the corresponding first sampling position via a transform function;
identify a reference parameter weight for the first sampling position;
determine an adjustment factor associated with the reference parameter weight for the first sampling position based on the transform function between the first sampling position and the second sampling position;
calculate an adjusted parameter weight for the second sampling position based on the reference parameter weight for the first sampling position and the adjustment factor associated with the reference parameter weight for the first sampling position; and
apply the adjusted parameter weight to the second sampling position in the second projection format when coding the 360-degree video content.

12. The apparatus of claim 11, wherein the first projection format comprises a cube map projection (CMP) format, and the second projection format comprises at least one of an unicube map projection (UNICMP) format, an equi-angular cubemap (EAC) format, an adjusted cubemap projection (ACP) format, or a hybrid cubemap projection (HCP) format.

13. The apparatus of claim 11, wherein the adjustment factor is determined based on a first derivative value of the transform function for a horizontal coordinate associated with at least one of the first sampling position or the second sampling position, and a second derivative value of the transform function for a vertical coordinate associated with at least one of the first sampling position or the second sampling position.

14. The apparatus of claim 11, wherein the reference parameter weight is identified based on a location of the first sampling position in the first projection format.

15. The apparatus of claim 11, wherein the processor for applying the adjusted parameter weight to the second sampling position in the second projection format is further configured to:
determine a quantization parameter for a transform-coded portion of the 360-degree video content associated with the second sampling position in the second projection format based on the adjusted parameter weight.

16. The apparatus of claim 11, wherein the reference parameter weight comprises a first weighted spherically uniform peak signal-to-noise ratio (WS-PSNR) weight and the adjusted parameter weight comprises a second WS-PSNR weight.

17. The apparatus of claim 16, wherein the processor for applying the adjusted parameter weight to the second sampling position in the second projection format is further configured to:
determine the second WS-PSNR weight for the second sampling position by adjusting the first WS-PSNR weight for the first sampling position using the adjustment factor.

18. The apparatus of claim 11, wherein to apply the adjusted parameter weight to the second sampling position in the second projection format, the processor is further configured to:
determine at least one of a distortion or a quality measurement associated the second sampling position in the second projection format using the adjusted parameter weight.

19. The apparatus of claim 11, wherein to apply the adjusted parameter weight to the second sampling position in the second projection format, the processor is further configured to:
determine a weighted sum of absolute difference (SAD) between the first sampling position and the second sampling position using the adjusted parameter weight.

20. The apparatus of claim 11, wherein the transform function is defined by parameters received in a bitstream.

\* \* \* \* \*